United States Patent
Takano

(10) Patent No.: US 6,212,231 B1
(45) Date of Patent: Apr. 3, 2001

(54) ASSIGN OF PELS OF A MACROBLOCK FOR COMPRESSION ENCODING TO A MEMORY SEQUENCE IN ONE OF BANKS OF DRAM

(75) Inventor: Hideto Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/997,305

(22) Filed: Dec. 23, 1997

(30) Foreign Application Priority Data

Dec. 25, 1996 (JP) .................................................. 8-344896

(51) Int. Cl.[7] .............................. H04N 7/12; H04N 7/133
(52) U.S. Cl. ........................................... 375/240; 348/384
(58) Field of Search .................................... 348/384, 390, 348/400, 401, 402, 409, 415, 416, 420; 375/240; 708/203; 709/247; 710/68; H04N 7/12, 7/133

(56) References Cited

U.S. PATENT DOCUMENTS

| | | | |
|---|---|---|---|
| 5,557,332 | * 9/1996 | Koyanagi | 348/402 |
| 5,598,514 | * 1/1997 | Purcell | 395/118 |
| 5,880,786 | 3/1999 | Oku et al. | 348/415 |
| 5,905,534 | * 5/1999 | Sumihiro | 348/402 |
| 5,912,676 | * 6/1999 | Malladi | 345/521 |

FOREIGN PATENT DOCUMENTS 8-65686   3/1996   (JP) .

OTHER PUBLICATIONS

Ohtani et al., "A Motion Estimation Processor For MPEG2 Video Real Time Encoding At Wide Search Range", IEEE Custom Integrated Circuits Conference, pp. 405–408, (1985).

* cited by examiner

*Primary Examiner*—Howard Britton
*Assistant Examiner*—Nhon T Diep
(74) *Attorney, Agent, or Firm*—Foley & Larnder

(57) ABSTRACT

In a video processor for compression encoding a series of picture elements of video data (frames or fields) based on macroblocks in some of the video data, each macroblock consisting of up to a predetermined number, such as 16×16, of picture elements in each video datum, a buffer stores the picture elements of the video datum. Controlled by a control signal produced in responses to the video data, an address signal is generated to assign the picture elements of each macroblock to one of memory sequences in one of parallel accessible banks of a frame memory, which is preferably a synchronous DRAM. The banks are allotted to each macroblock and two macroblocks which are contiguous to this each macroblock in each video datum in each macroblock row and each macroblock column, respectively. In this manner, the banks are allotted, when two in number, to the macroblocks which are arranged in each video datum in a checkered pattern.

20 Claims, 8 Drawing Sheets

FIG. 6

| | | | | |
|---|---|---|---|---|
| 0 | 1 | 2 | 3 | |
| 4 | 5 | 6 | 7 | |
| ... | ... | ... | ... | |
| 60 | 61 | 62 | 63 | | subblock N
subblock N+1
subblock N+15

ASSIGN OF PELS OF A MACROBLOCK FOR COMPRESSION ENCODING TO A MEMORY SEQUENCE IN ONE OF BANKS OF DRAM

BACKGROUND OF THE INVENTION

This invention relates to a video data arranging method for arranging macroblocks in a plurality of parallel accessible banks of a frame memory and to a video processor for processing macroblock by macroblock the video data by using the frame memory, wherein the frame memory is particularly an SDRAM (synchronous dynamic random access memory) capable of high-speed data transfer.

In the manner which will later be described in greater detail, a conventional video processor of this type comprises a video processing unit for compression encoding, as by an MPEG (Moving Picture Experts Group) scheme, the video data into an encoded bit stream based on macroblocks read from the frame memory. The MPEG scheme is featured by an appreciable decrease in an amount of information by the so-called motion compensation of using correlation among a succession of the video data, each of which may be a frame or a field. Although each macroblock should be a square area consisting in each video datum of sixteen by sixteen picture elements or pels in the MPEG scheme, no restriction is imposed therein on the manner of compression encoding. It is therefore possible to make the video processing unit have an optional structure even when the MPEG scheme is used.

Such a video processor is described in a paper presented by A. Ohtani and ten others to the IEEE 1995 Custom Integrated Circuit Conference, pages 405 to 408 or 17.4.1 to 17.4.4, under the title of "A Motion Estimation Processor for MPEG2 Video Real Time Encoding at Wide Search Range". In this paper, a search range input interface is described to a certain extent for use in generating an address signal of the frame memory consisting presumably of banks of the SDRAM. Such banks are, however, referred to merely as external Synchronous-DRAM's (SDRAM's) with no mention to their details.

In general, each bank of the frame memory comprises a plurality of memory sequences which may be memory rows consecutively arranged in memory columns and consist of memory cells serially given memory addresses, respectively, in each of the banks. As for the video data, each video datum comprises the macroblocks in macroblock rows and macroblock columns. Each macroblock comprises a plurality of picture element rows and a plurality of picture element columns, such as a matrix of sixteen picture element rows and sixteen picture element columns. Each picture element row is alternatively called a subblock which is used in the video processor as a signal burst having a burst length of sixteen picture elements and may consist of a plurality of words, such as four words. The video data are supplied to the video processor according to a raster scan and may be of the NTSC technique comprising luminance data Y, blue chrominance data Cb, and red chrominance data Cr. Amounts of data of such luminance and chrominance data are dependent on the manner of encoding and may be 4:4:4, 4:2:2, 4:2:0, or the like. Although specified in the MPEG scheme, each macroblock may have an area dependent on an efficiency of the motion compensation and an amount of overhead information of motion vectors which must somehow be searched in the macroblocks in order to implement the motion compensation. It will be surmised mainly throughout the following that the banks are two in number and are a bank A and another bank B.

In the conventional video processor described above, the picture elements of consecutive subblocks in each macroblock are assigned alternatingly to the banks A and B. More particularly, let a certain one of the macroblock consist of subblocks N, N+1, . . . , and N+15, where N represents an integer identifying the macroblock under consideration in one of the video data. In the video processor being described, a read or write command is issued cyclically to the banks, such as the banks A and B, to transfer the words of each subblock in connection as the signal burst.

It is possible to presume without loss of generality that the read or write command first indicates the memory address of one of the memory cells that is assigned in the bank A to a leading or leftmost picture element of the subblock N. Next, the read or write command indicates the memory address of one of the memory cells that is in the bank B for the leading picture element of the subblock N+1. For one of the macroblock that is under consideration, the read or write command eventually indicates in the bank B the memory addresses of a different one of the memory cells that is for the leading picture element of the subblock N+15. In this manner, the video data are wholly transferred as sixteen signal bursts in connection with the macroblock in question.

In connection with the two or more banks in general, it should be noted on accessing a specified one of the memory sequences leaving a preceding one of the memory sequences that the read or write command must be accompanied by an active command for preliminarily activating memory addresses of the specified one of the memory sequences. On accessing a succeeding one of the memory sequences leaving the specified one of the memory sequences, the read or write command must be accompanied by a precharge operation for subsequently precharging the specified one of the memory sequences. Alternatively, it is known to substitute a read or write auto-precharge command for a combination of the read or write command and the precharge command in automatically precharging the specified one of the memory sequences after read or write of the specified memory sequence.

It may be mentioned here that the video processor is kept in operation by a system clock of a clock period. Several clock periods are necessary in general for activation or precharge of the specified one of the memory sequences. On the other hand, it has been mandatory in the conventional video processor to change or switch a sequence or row address signal every time when the data transfer is completed in connection with each subblock of the macroblock. It has therefore been impossible with the conventional video processor to achieve a raised efficiency of the data transfer and to thereby provide a video data arranging method and a video processor which are of the type described before and are operable at a high speed.

SUMMARY OF THE INVENTION

It is consequently an object of the present invention to provide a video data arranging method of arranging macroblocks in a plurality of parallel accessible banks of a frame memory for compression encoding a succession of video data, which method has a high efficiency of data transfer.

It is another object of this invention to provide a video data arranging method which is of the type described and is operable at a high speed.

It is still another object of this invention to provide a video data arranging method which is of the type described and in which video data are transferred macroblock by macroblock.

It is yet another object of this invention to provide a video data arranging method which is of the type described and in which the video data are transferred by a different unit other than a macroblock unit.

It is a different object of this invention to provide a video processor in which implemented is a video data arranging method of the type described.

Other objects of this invention will become clear as the description proceeds.

In accordance with an aspect of this invention, there is provided a video data arranging method of arranging macroblocks in a plurality of parallel accessible banks of a frame memory for compression encoding a succession of video data, each of the macroblocks comprising a predetermined number of picture elements of the video data, each bank comprising a plurality of memory sequences, the video data arranging method comprising the step of assigning the picture elements of each macroblock to one of the memory sequences in one of the banks.

In accordance with a different aspect of this invention, there is provided a video processor which is for processing a succession of video data and comprises video processing means for compression encoding the video data into an encoded bit stream based on macroblocks read from a frame memory comprising a plurality of parallel accessible banks, each of the macroblocks comprising a predetermined number of picture elements of the video data, each bank comprising a plurality of memory sequences, and which further comprises (A) buffer means for temporarily storing the video data as stored data, (B) control means responsive to the succession for producing a control signal, and (C) generating means responsive to the control signal for generating an address signal specifying one of the memory sequences in one of the banks for the picture elements belonging in the stored data to each macroblock.

BRIEF DESCRIPTION OF THE DRAWING

FIG. 6 is a diagram partially representing a video datum for use in describing operation of the video processor mentioned in conjunction with FIG. 5;

DESCRIPTION OF THE PREFERRED EMBODIMENT

Figure 1:
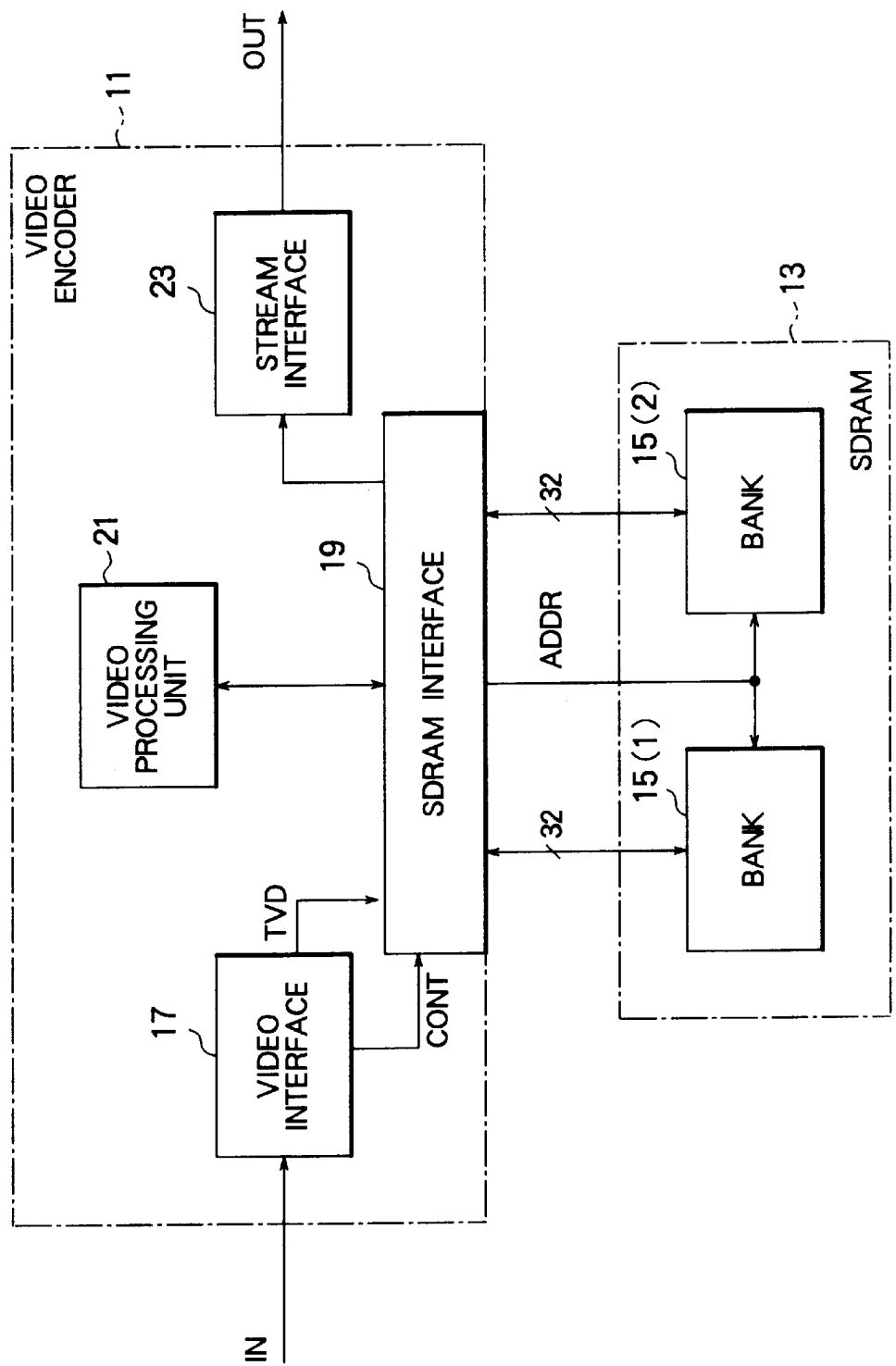
FIG. 1 is a block diagram of a video processor in general and comprising a synchronous dynamic random access memory operable as a frame memory.

Referring to FIG. 1, a video processor comprises in general an MPEG (Memory Picture Experts Group) video encoder 11 and an SDRAM (synchronous dynamic random access memory) 13 which is operable as a frame memory as will become clear as the description proceeds. The video encoder 11 is supplied as a device input signal IN with a succession of video data and compression encodes this succession of video data in cooperation with the SDRAM 13 in accordance with an MPEG scheme into an encoded bit stream which the video encoder 11 produces as a device output signal OUT. The SDRAM 13 is preferred for use as the frame memory because the SDRAM can deal with data transfer at a high speed.

The SDRAM 13 comprises a plurality of parallel accessible banks 15. In the example being illustrated, the banks 15 are two in number and are referred to as an A bank 15(1) and a B bank 15(2). Each bank 15 (the suffixes 1 and 2 omitted) comprises a plurality of memory sequences or rows which will later be illustrated. Such memory rows are consecutively arranged in memory columns. In each bank, the memory sequences consist of memory cells which may be serially given memory addresses, respectively. Alternatively, such memory cells may be given a row address in each memory sequence. It is possible to identify the memory cells by the row addresses and column addresses given to the memory cells. It is now understood that the memory may be arranged in each bank 15 in columns and rows in a matrix fashion and that each memory sequence need not necessary correspond to one of the rows of a matrix and may comprise two or more of such rows.

The video encoder 11 comprises a video interface 17 for transferring succession of the video data as transferred video data TVD and responsive to the succession of video data for producing a control signal CONT which will become clear as the description proceeds. Connected to the banks, such as 15(1) and 15(2) of the SDRAM 13, and to the video interface 17, an SDRAM interface 19 delivers an SDRAM address signal ADDR to the banks 15(1) and 15(2) under the control of the control signal to specify the memory cells in each of the banks 15(1) and 15(2). The SDRAM interface 19 furthermore transfers picture elements PQ of the transferred video data to and from the memory cells specified in each of the banks 15(1) and 15(2). Connected to the SDRAM interface 19, a video processing unit 21 compression encodes the picture elements supplied from the banks 15(1) and 15(2) through the SDRAM interface 19. In the illustrated example, the video processing unit 21 deals with the picture elements in accordance with the MPEG scheme.

More particularly, the video processing unit 21 is operable on a plurality of video data, namely, frames or fields of the succession of video data. Each video datum therefore corresponds to a frame or field consisting of a certain number of the picture elements arranged along horizontal lines with a vertical scan or arranged in accordance a raster scan. The succession of video data may be a succession of color data the NTSC technique comprising luminance data Y, blue chrominance data Cb, and red chrominance data Cr. In the manner described heretobefore, amounts of such luminance and chrominance data are dependent on the manner of encoding and are, for example, 4:2:2.

In general, the video processing unit 21 compression encodes the video data by using interframe or interfield correlation using, when the MPEG scheme is resorted to, the picture elements of macroblocks having corresponding areas in the video data, namely, frames or fields. Each video datum comprises the macroblocks in macroblock rows and macroblock columns. According to the MPEG scheme, each macroblock consists of 16×16 picture elements, namely, sixteen picture element rows, each picture element row consisting of sixteen picture elements with the 256 picture elements of the sixteen picture element rows aligned along sixteen picture element columns.

Each picture element row is alternatively called a subblock and is divided by four into four words. In the video processor in general, the SDRAM interface 19 transfers each subblock as a signal burst having a burst length of four words from the video interface 17 to one of the banks, such as 15(1) and 15(2), according to the SDRAM address signal and similarly from one of the banks to the video processor unit 21. Dealing with such subblocks read from the banks in connection with a certain number of the video data, the video processing device 21 supplies encoded data back to the SDRAM interface 19. Connected to the SDRAM interface 19, a stream interface 23 produces the encoded data as the encoded bit stream, namely, as the device output signal OUT. Incidentally, the video processing unit 21 need not necessarily process the video data read from the SDRAM 13 in accordance with the MPEG scheme but any other desired scheme may be used. It is therefore possible for the SDRAM interface 19 to transfer the video data succession between the SDRAM 13 and the video processing unit 21 based not necessarily on the macroblocks but on any other units of the video data.

Figure 2:
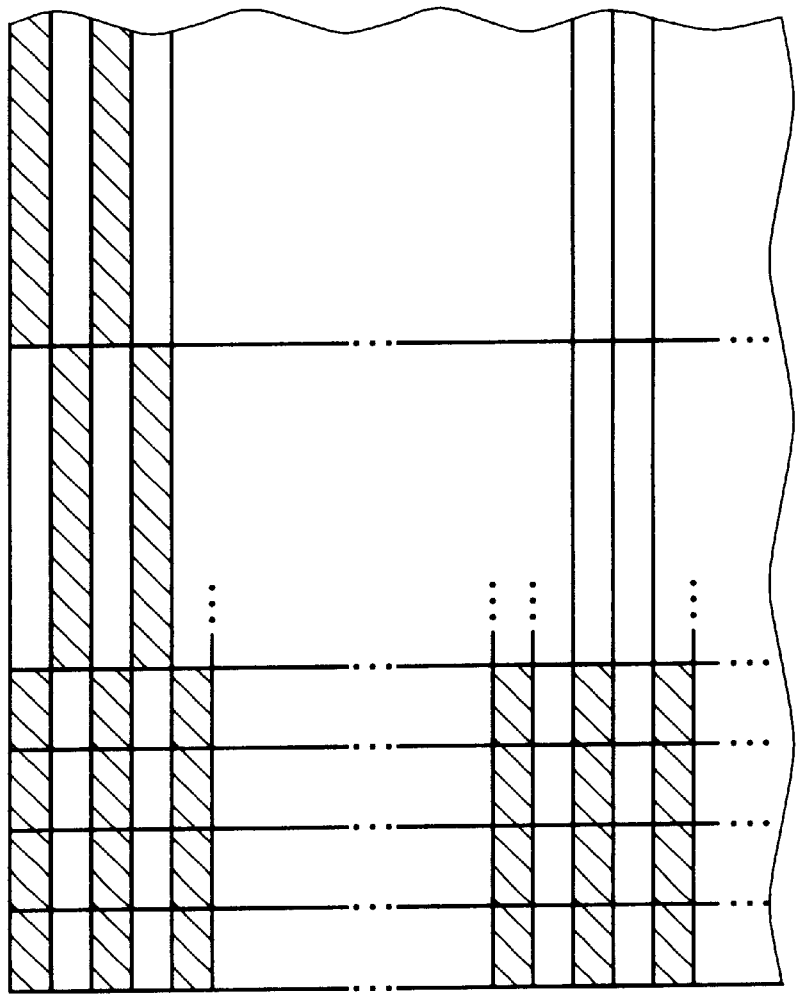
FIG. 2 is a diagram partially representing a video datum for use in describing operation of a conventional video processor of the type illustrated in FIG. 1.

Turning to FIG. 2 with FIG. 1 continuously referred to and with use of the macroblock presumed, a part of the video datum comprises in a first macroblock row in which (1, 1)-th and (1, 2)-th macroblocks are depicted in full, each with a longer length in a direction of the macroblock columns merely for convenience of illustration. In the first macroblock row, a (1, 3)-th macroblock is nearly entirely depicted with its right-hand part cut away. Contiguously beneath the first macroblock row, only partly depicted is a second macroblock row in which (2, 1)-th to (2, 3)-th macroblocks are partially depicted. The (1, 1)-th macroblock consists of sixty-four words, each depicted as a small rectangle, and is divided into first to sixteenth subblocks. Such subblocks are serially numbered in the video datum in a predetermined order. It is assumed here that the first to the sixteenth subblocks are identified in the (1, 1)-th macroblock as subblocks N, N+1, N+2, N+3, N+4, . . . , N+14, and N+15, where N represents an integer dependent on a position which a macroblock has in the video data. With such serial subblock numbers neglected, the macroblocks in each macroblock will be referred to as first to sixteenth subblocks in the manner described above in connection with the (1, 1)-th macroblock.

According to the raster scan, the picture elements of the video data are produced in FIG. 2 from left to right first along the first subblocks of the macroblocks in the first macroblock row, second along the second subblocks of the first macroblock row, . . . , along the sixteenth subblocks of the first macroblock row, and then along the first subblocks of the second macroblock row irrespective of whether the video datum corresponds to each frame or each field. In the conventional video processor comprising two banks 15(1) and 15(2) in the SDRAM 13, the subblocks of the macroblocks contiguous to one another in the macroblock rows and columns are alternatingly written in the banks 15(1) and 15(2). For example, the subblocks with hatches are written in the A bank 15(1). The subblocks with no hatches are written in the B bank 15(2). The control signal therefore makes a memory (cell) address signal ADD specify in the SDRAM address signal the memory cells of the banks 15(1) and 15(2) accordingly. Similarly, the SDRAM interface 19 generates the memory address signal in response to the control signal so as to read, for supply to the video processing unit 21 from the banks 15(1) and 15(2), the subblocks of the contiguous video data used in the compression encoding.

Figure 3:
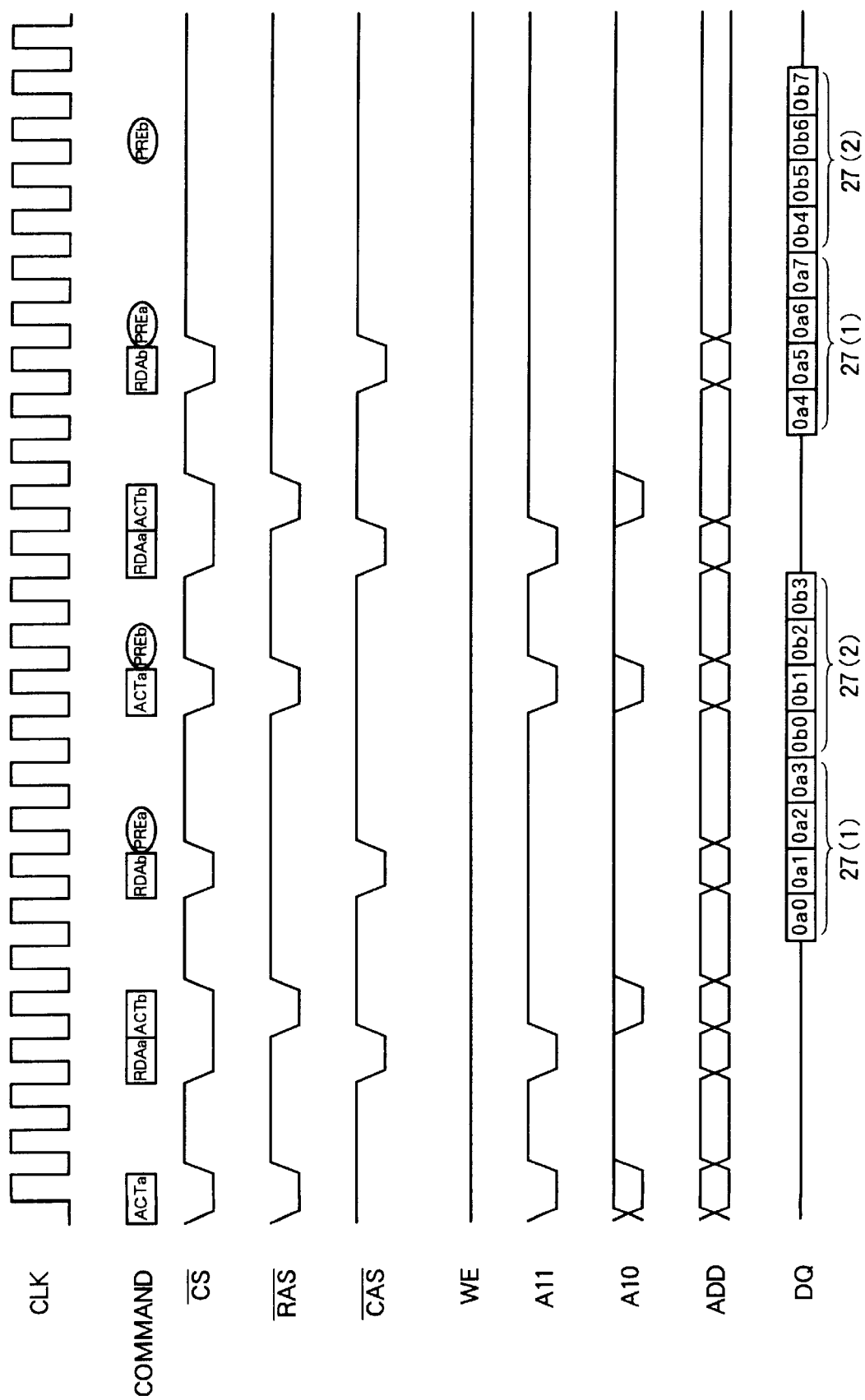
FIG. 3 is a schematic timing chart for use in describing a read operation of the conventional video processor mentioned in conjunction with FIG. 2.

Referring afresh to FIG. 3 and continuously to FIGS. 1 and 2, read of the video data from the SDRAM 13 will be described more in detail. In the manner described hereinabove, the video processor is kept in operation by the system clock of the clock period. The system clock is schematically depicted along a top or first row with a legend CLK. Along a second row with a legend COMMAND, the active commands for the A and the B banks 15(1) and 15(2) are indicated in rectangles as ACTa and ACTb, respectively. The read auto-precharge commands for the A and the B banks 15(1) and 15(2) are indicated in rectangles as RDAa and RDAb, respectively. By such auto-precharge commands, the precharge operation begins in the A and the B banks 15(1) and 15(2) as indicated in ellipses with labels PREa and PREb, respectively. Such commands become effective in response to a command set signal $\overline{CS}$ depicted along a third row.

In order to access to the memory cells in each of the banks, such as 15(1) and 15(2), a row access strobe $\overline{RAS}$ and a column access strobe $\overline{CAS}$ are used as depicted along fourth and fifth rows. It is presumed in such schematic time charts that the $\overline{CAS}$ latency is three clock periods long. Read and write are separately indicated in the SDRAM address signal by a low and a high level of a write enable signal WE depicted along a sixth row. In addition to the commands, a specified bank of the banks 15(1) and 15(2) is indicated by a bank address signal A11 and one of memory sequences by a sequence address A10 depicted along seventh and eighth row. In each of the banks 15, the memory cells are specified by the memory address signal depicted in a ninth row with a legend ADD. It is now understood that the SDRAM 19 generates the commands COMMAND to the memory address signal ADD collectively as the SDRAM address signal ADDR.

In FIG. 3, parts of the memory sequences of the A and the B banks are schematically illustrated along a tenth or bottom row by reference numerals 27(1) and 27(2). It should be known in this tenth row that the memory cells for each word of the video data are indicated by a rectangle similar to that used along the second row for each command. It is surmised that the picture elements of the macroblocks are already stored before the read in the memory sequences 27 (the suffixes 1 and 2 omitted) with the words in the subblocks N to N+15 successively indicated by 0a0, 0a1, 0a2, 0a3, . . . , 0a63, and 0a64 as will presently be depicted and with corresponding words in the (1, 2)-th macroblock indicated by 0b0, 0b1, 0b2, and so forth. In the conventional video processor, the SDRAM interface 19 generates the memory address signal ADD for read of the picture elements from the banks 17(1) and 17(2) for supply as the signal bursts to the video processing unit 21 in the manner depicted in this tenth row. That is, the banks 15(1) and 15(2) are alternatingly read until the picture elements of at least two video data are transferred to the video processor unit 21.

Figure 4:
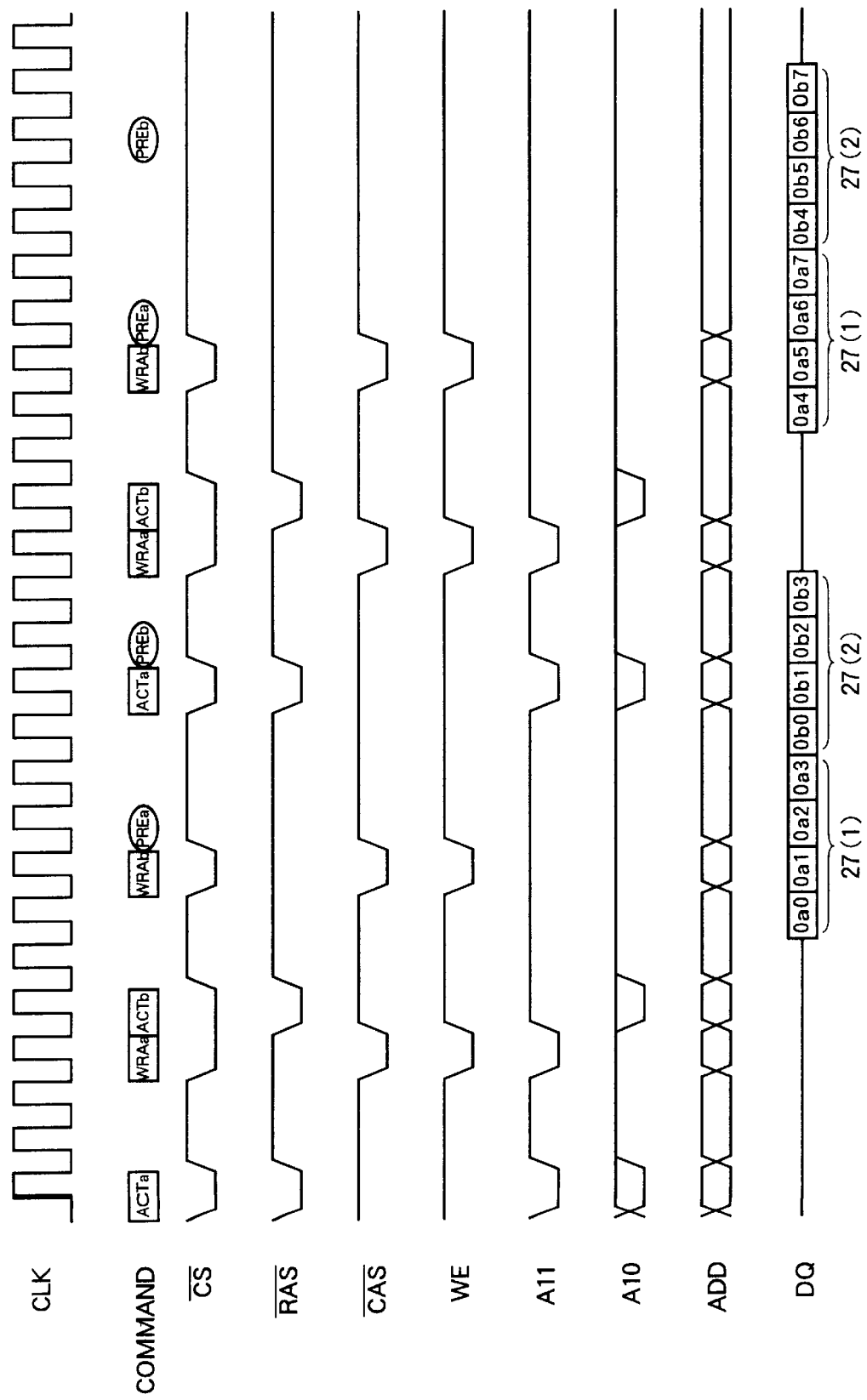
FIG. 4 is a schematic timing chart for use in describing a write operation of the conventional video processor mentioned in connection with FIG. 2.

Turning to FIG. 4 with FIGS. 1 and 2 continuously referred to, write of the video data in the SDRAM 13 will be described more in detail in connection with the conventional video processor. This write operation is not much different from the read illustrated with reference to FIG. 3. Write auto-precharge commands are depicted like in FIG. 3 along the second row as WRAa and WRAb for the A and the B banks 15(1) and 15(2), respectively. The words of the (1, 1)-th and the (1, 2)-th macroblocks are written in the memory sequences 27(1) and 27(2) of the A and the B banks 15(1) and 15(2) at timings which are three clock intervals earlier than the read.

Figure 5:
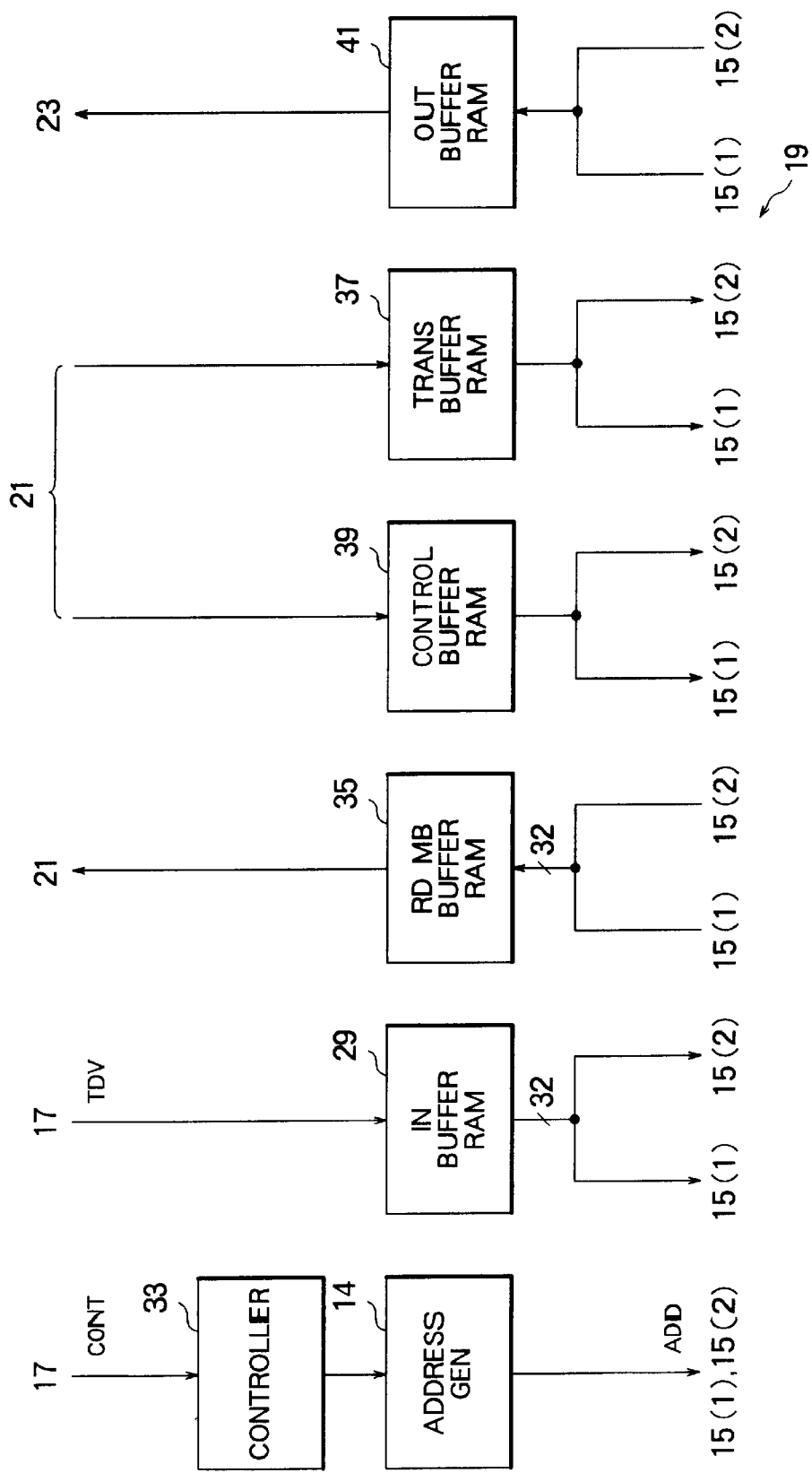
FIG. 5 is a block diagram of a synchronous dynamic random access memory interface for use in a video processor which is of the type illustrated in FIG. 1 and is according to an embodiment of the instant invention.

Referring again to FIG. 1 and afresh to FIG. 5, a video processor according to a preferred embodiment of the present invention is identical with the conventional one insofar as illustrated in FIG. 1. As depicted in FIG. 5, the SDRAM interface 19 comprises an input (IN) buffer RAM (random access memory) 29 for temporarily storing, as stored data, the transferred video data TVD transferred thereto from the video interface 17. Consequently, a combination of the video interface 17 and the input buffer RAM 29 serve as a buffer arrangement for temporarily storing the succession of video data, namely, the device input signal IN, as the stored data.

An address generator 14 is for generating the SDRAM address signal ADD for delivery to the banks, such as 15(1) and 15(2), of the SDRAM 13. Supplied with the control signal CONT from the video interface 17, a controller 33 controls the address generator 31 in the manner which will be described in the following. A combination of the video interface 17 and the controller 33 serves as a control arrangement responsive to the succession of video data for producing an output signal which is similar to the control signal used in the conventional video processor and may also be referred to as a control signal.

Turning to FIG. 6 during a short while, a part of the video datum is depicted as in FIG. 2. Each macroblock is depicted here as a greater square. In the illustrated video data part, (1, 1)-th to (1, 3)-th, (2, 1)-th to (2, 3)-th, and (3, 1)-th to (3, 3)-th macroblocks are depicted in full. In the (1,1)-th macroblock, the words are depicted as small squares and are numbered from 0 to 63 as in FIGS. 3 and 4. It should be noted in FIG. 6 that only the subblocks N, N+1, and N+15 are depicted with their height much exaggerated in comparison with their lengths, each sixteen picture cells long, and with subblocks N+2 to N+14 omitted. This is in order to depict each macroblock as rectangle.

In contrast to the memory address signal ADD used in the conventional video processor, the memory address signal specifies in this invention one of the memory sequences in one of the banks for the picture elements of each macroblock. In other words, the words 0 to 63 of the (1, 1)-th macroblock are assigned to one memory sequence in one of the banks that may be only the A bank 15(1). In this manner, the banks, such as 15(l) and 15(2), are cyclically specified for the picture elements of the macroblocks. When the banks are the A and the B banks 15(1) and 15(2) with the (1, 1)-th macroblock assigned to the A bank 15(1), the (1, 2)-th and the (2, 1)-th macroblocks are assigned to the B bank 15(2) with their picture elements assigned to different memory sequences in the B bank 15(2). In this manner, the macroblocks in each picture datum are assigned to the A and the B banks 15(1) and 15(2) in a checkered pattern.

Turning back to FIG. 5 with FIGS. 1 and 6 continuously referred to, the SDRAM interface 19 further comprises a read macroblock (RD MB) buffer RAM 35 connected to the banks, such as 15(1) and 15(2), for temporarily storing the picture elements of the macroblocks read from the banks in connection with at least two video data. From the read macroblock buffer RAM 35, such frame or field video data are transferred to the video processing device 21 and are compression encoded into the encoded video data together with a selected one of the frame or field video data that is used as a basis of compression encoding into the encoded video data. Connected to the banks, such as 15(1) and 15(2), a transfer (TRANS) buffer RAM 37 is for temporarily storing the encoded video data. A control (CONT) buffer RAM 39 is for temporarily storing the selected frame or field video datum from the banks 15(1) and 15(2) for use in controlling the transfer buffer RAM 37 so as to make the latter 37 produce the selected frame or field video datum as a video data bit stream. Connected to the banks 15(1) and 15(2), an output (OUT) buffer RAM 41 is for rearranging, if necessary, the video data stream into the encoded bit stream which is identical with that delivered to the stream interface 23 in the conventional video processor. It is now understood that a combination of the video processing unit 21, the stream interface 23, the read macroblock buffer RAM 35, the transfer buffer RAM 37, the control buffer RAM 39, and the output buffer RAM 41 serves as a video processing arrangement for compression encoding the video data succession into the encoded bit stream and that this arrangement corresponds to the video processing unit 21 and the stream interface 23 which are described in conjunction with the conventional video processor.

Referring now to FIG. 7 and again to FIGS. 1, 5, and 6, read of the picture elements of the video data succession will be described in connection with the video processor being illustrated. It should be noted that FIG. 7 is similar to FIG. 3 except for the fact that FIG. 7 is markedly different from FIG. 2.

Figure 7:
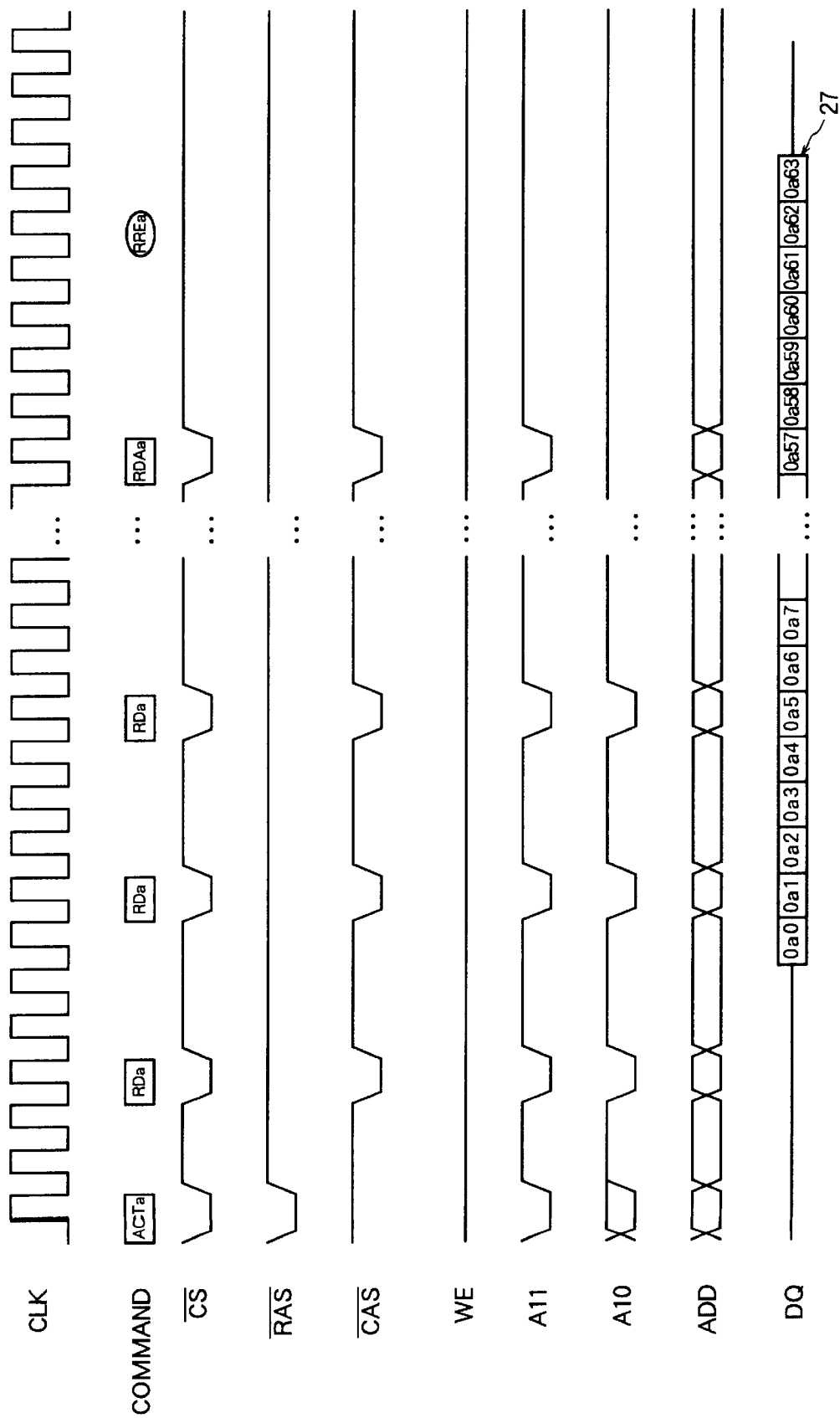
FIG. 7 is a schematic timing chart for use in describing a read operation of the video processor mentioned in connection with FIG. 5.

In FIG. 7, it should additionally be noted that the picture elements of the (1, 1)-th macroblock are assigned to one of the memory sequences in one of the banks, such as the A bank 15(1). In the second row, used are, instead of each read auto-precharge command depicted in FIG. 3, mostly the read command which is described heretobefore, for the A bank 15(1) alone, and depicted in the rectangle as RDa. Along the bottom row, the memory sequence is only in the A bank 15(1) and is therefore designated by a simple reference numeral 27 without the suffix (1). Controlled by the controller 33, the address generator 14 supplies the A bank 15(1) with the memory address signal ADD which consecutively specifies the memory cells in the memory sequence 27 for storage and read out of the (1, 1)-th macroblock. The words 0 to 63 of this macroblock are therefore written in and read from the memory sequence 27 of the A bank 15(1) in the manner indicated by 0a0, 0a1, 0a2, . . . , 0a62, and 0a63.

Figure 8:
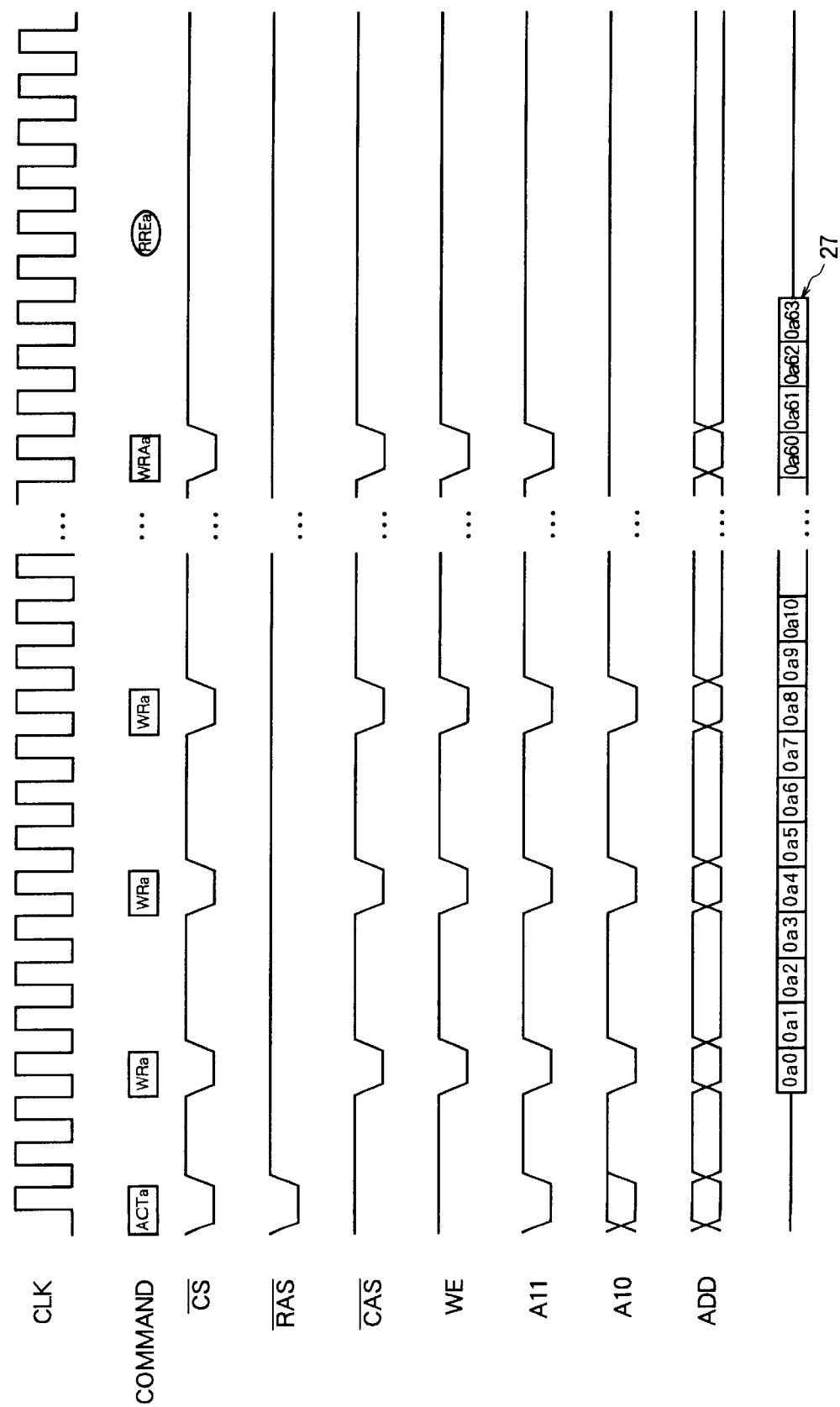
FIG. 8 is a schematic time chart for use in describing a write operation of the video processor mentioned in connection with FIG. 5.

Turning to FIG. 8 with FIGS. 1 and 5 to 7 continuously referred to, described will be write of the picture elements of the (1, 1)-th macroblock in the memory sequence 27 in the illustrated video processor. FIG. 8 corresponds to FIG. 4 used in conjunction with the conventional video processor.

In FIG. 8, the write command described hereinabove is substituted for each of the write auto-precharge commands used in FIG. 4 and is indicated by WRa in a rectangle except for a last one that stands last in a sequence of the memory address signal for the (1, 1)-th macroblock in the manner depicted along the second row. The words of the (1, 1)-th macroblock are written in the memory sequence of the A bank 15(1) as 0a0, 0a1, 0a2, . . . , 0a62, and 0a63.

FIGS. 3, 4, 7, and 8 will now be used in exemplifying merits attained by this invention in terms of the number of clock periods which are indispensable in transferring sixteen signal bursts, namely, sixty-four picture elements in each macroblock of each video datum in the video processor according to this invention and sixty-four picture elements in total of two macroblocks of each video datum in the conventional video processor. In FIG. 3 or 4, used are four active commands, first for one of the two banks, such as the A bank 15(1), and subsequently alternatingly for the B and the A banks 15(2) and 15(1) until eventually for the other of the two banks, namely, the B bank 15(2), and then sixteen read or write auto-precharge commands. Three clock periods are mandatory when each active command is dispatched to one of the banks, such as 15(1) and 15(2), until the memory addresses are activated in response to an immediately following read or write command which may be the read or write auto-precharge command. In FIG. 3 or 4, two clock periods are necessary before the precharge operation actually begins to take place. This precharge operation lasts three clock periods until completion. As a consequence, it takes (3+4×2)×8+2+3, namely, ninty-three clock periods. A transfer efficiency for the sixty-four words is therefore equal to 64/93×100=68.8%.

In FIG. 7 or 8, used are only one active command, fifteen read or write commands, and one read or write auto-precharge command. In this case, five clock periods are unavoidable before actual beginning of the precharge operation which lasts four clock periods until completion. As a result, it takes 3+4×15+5+4, namely, seventy-two clock periods. The transfer efficiency is therefore equal to 64/72× 100=88.9%. This clock periods are twenty-one clock periods less than those indispensable for the conventional video processor. The transfer efficiency is improved by 20.1 points. It is now clearly understood that the video processor of this invention is operable at a higher speed and has a raised transfer efficiency.

Reviewing FIGS. 1 and 5, the transfer video data may be delivered from the input interface 17 and stored in the input buffer RAM 29 as the stored data according to the raster scan. In this event, the picture elements of each macroblock in each video datum should be selected one memory sequence after another along each memory column for delivery to one of the banks, such as the A bank 15(1), in response to an access signal which should be supplied to the input buffer RAM 29 from the address generator 31. For this purpose, it is necessary to use a connection which is not shown in FIG. 5. and is different from the connection between the address generator 14 and the banks, such as 15(1) and 15(2). Alternatively, it is possible to understand that the picture elements are rearranged by the input interface 17 in each four-word sequence in the conventional video processor and in each 64-word sequence with the macroblocks selected in the checkered pattern in each video datum for storage in the input buffer RAM 29 in accordance with this invention when the banks are two in number.

It is possible also in this invention to make the input interface 17 comprise either a combination of the input buffer RAM 29, the address generator 31, and the controller 33 or a likewise operable circuit elements rather than in the SDRAM interface 19. In this event, the control signal CONT is used within the input interface 17 and is not delivered to the SDRAM interface 19.

It is needless to say in connection with this invention that the video processing arrangement can deal with at least two video data for compression encoding in compliance with any scheme other than the MPEG scheme. It is likewise possible to make the video processing arrangement deal with the picture elements or the burst signals in any unit other than a macroblock unit. Even when produced by a video processor according to this invention, the encoded bit stream can be expansion decoded into a reproduction of the video data succession supplied thereto as the device input signal with no changes in a known video processor for expansion decoding the encoded bit stream. When either the above-mentioned control arrangement or a correspondingly operable arrangement is included in the input interface 17 rather than in the SDRAM interface 19, it is possible to refer to such an input interface 17 afresh as a control arrangement. When the SDRAM 13 comprises a great number of banks, it is possible to select those of the banks which should be parallel accessed for the macroblocks of a predetermined number of video data, namely, frames or fields, used in the compression encoding.

What is claimed is:

1. A video data arranging method of arranging macroblocks in a plurality of parallel accessible banks of a SDRAM for compression encoding a succession of video data, each of said macroblocks comprising a predetermined number of picture elements of said video data, each bank comprising a plurality of memory sequences, said video data arranging method comprising the step of assigning the picture elements of each macroblock to a common one to one of said memory sequences in one of said banks so that said macroblocks are assigned to the respective banks in a checkered pattern.

2. A video data arranging method as claimed in claim 1, said macroblocks being arranged in each of said video data in macroblock rows and macroblock columns so that one macroblock is contiguous in each macroblock row and each macroblock column to two macroblocks, respectively, wherein said assigning step assigns the picture elements of said one macroblock and said two macroblocks respectively to three memory sequences in said one of banks, a different one of said banks, and one of said banks that is different from said different one of banks.

3. A video data arranging method as claimed in claim 2, said banks being first and second banks, wherein said assigning step assigns the picture elements of said macroblocks to said first and said second banks so that the macroblocks are allotted to said first and said second banks in a checkered pattern in each of said video data.

4. A video data arranging method as claimed in claim 3, the picture elements of said succession of video data being supplied in an order of raster scan as a supplied succession of video data, further comprising the step of buffering said supplied succession as a buffered succession, wherein said assigning step assigns the picture elements of each macroblock in said buffered succession to said one of memory sequences in said one of banks.

5. A video data arranging method as claimed in claim 2, the picture elements of said succession of video data being supplied in an order of raster scan as a supplied succession of video data, further comprising the step of buffering said supplied succession as a buffered succession, wherein said assigning step assigns the picture elements of each macroblock in said buffered succession to said one of memory sequences in said one of banks.

6. A video data arranging method as claimed in claim 1, the picture elements of said succession of video data being supplied in an order of raster scan as a supplied succession of video data, further comprising the step of buffering said supplied succession as a buffered succession, wherein said assigning step assigns the picture elements of each macroblock in said buffered succession to said one of memory sequences in said one of banks.

7. A video processor for processing a succession of video data, comprising:
   video processing means for compression encoding said video data into an encoded bit stream based on macroblocks read from a frame memory having a plurality of parallel accessible banks wherein the macroblocks are stored in respective banks in a checkered pattern,
   each of said macroblocks comprising a predetermined number of picture elements of said video data,
   each bank comprising a plurality of memory sequences,
   said video processor further comprising:
   buffer means for temporarily storing said video data as stored data;
   control means responsive to said succession for producing a control signal; and generating means responsive to said control signal for generating an address signal specifying a common one of said memory sequences in one of said banks for the picture elements belonging in said stored data to each macroblock.

8. A video processor as claimed in claim 7, said macroblocks being arranged in each of said video data in macroblock rows and macroblock columns, wherein said control means produces said control signal so as to make said address signal cyclically specify said banks, one at a time as said one of banks, for the picture elements of said each macroblock and two of said macroblocks that are contiguous to said each macroblock in each macroblock row and in each macroblock column, respectively.

9. A video processor as claimed in claim 8, said banks being first and second banks, wherein said control means produces said control signal so as to make said address signal alternatingly specify said first and said second banks as said one of banks for the picture elements of the macroblocks which are arranged in each of said video data in a checkered pattern.

10. A video processor as claimed in claim 9, wherein said control means produces said control signal so as to make said address signal be accompanied by a command for activating, on accessing a specified one of said memory sequences and on leaving said specified one of memory sequences, a sequence address of said specified one of memory sequences and precharging said specified one of memory sequences, respectively.

11. A video processor as claimed in claim 10, said video data being arranged in said succession in an order of raster scan, the picture elements of each of said macroblocks being divided into a first plurality of subblocks, each subblock consisting of a second plurality of the picture elements, wherein said control means produces said control signal so as to make said address signal allot macroblocks by macroblocks and subblock by subblock the picture elements of said stored data to said one of memory sequences in said one of banks.

12. A video processor as claimed in claim 11, wherein each of said first and said second pluralities is equal to sixteen.

13. A video processor as claimed in claim 10, with the picture elements of said succession of video data supplied in an order of raster scan as a supplied succession of video data, wherein said buffer means temporarily stores said supplied succession as a buffered succession of said stored data, said control means producing said control signal so as to make said address signal specify said one of sequences in said one of banks for the picture elements of each macroblock in said buffered succession.

14. A video processor as claimed in claim 8, said banks being first and second banks, wherein said control means produces said control signal so as to make said address signal alternatingly specify said first and said second banks as said one of banks for the picture elements of the macroblocks which are arranged in each of said video data in a checkered pattern.

15. A video processor as claimed in claim 14, wherein said control means produces said control signal so as to make said address signal be accompanied by a command for activating, on accessing a specified one of said memory sequences and on leaving said specified one of memory sequences, a sequence address of said specified one of memory sequences and precharging said specified one of memory sequences, respectively.

16. A video processor as claimed in claim 15, with the picture elements of said succession of video data supplied in an order of raster scan as a supplied succession of video data, wherein said buffer means temporarily stores said supplied succession as a buffered succession of said stored data, said control means producing said control signal so as to make said address signal specify said one of sequences in said one of banks for the picture elements of each macroblock in said buffered succession.

17. A video processor as claimed in claim 7, said macroblocks being arranged in each of said video data in macroblock rows and macroblock columns, wherein said control means produces said control signal so as to make said address signal cyclically specify said banks, one at a time as said one of banks, for the picture elements of said each macroblock and two of said macroblocks that are contiguous to said each macroblock in each macroblock row and in each macroblock column, respectively.

18. A video processor as claimed in claim 17, said banks being first and second banks, wherein said control means produces said control signal so as to make said address signal alternatingly specify said first and said second banks as said one of banks for the picture elements of the macroblocks which are arranged in each of said video data in a checkered pattern.

19. A video processor as claimed in claim 18, wherein said control means produces said control signal so as to make said address signal be accompanied by a command for activating, on accessing a specified one of said memory sequences and on leaving said specified one of memory sequences, a sequence address of said specified one of memory addresses and precharging said specified one of memory sequences, respectively.

20. A video processor as claimed in claim 19, with the picture elements of said succession of video data supplied in an order of raster scan as a supplied succession of video data, wherein said buffer means temporarily stores said supplied succession as a buffered succession of said stored data, said control means producing said control signal so as to make said address signal specify said one of memory sequences in said one of banks for the picture elements of each macroblock in said buffered succession.

* * * * *